May 31, 1932. A. PFAU 1,860,619
VALVE
Filed July 12, 1930
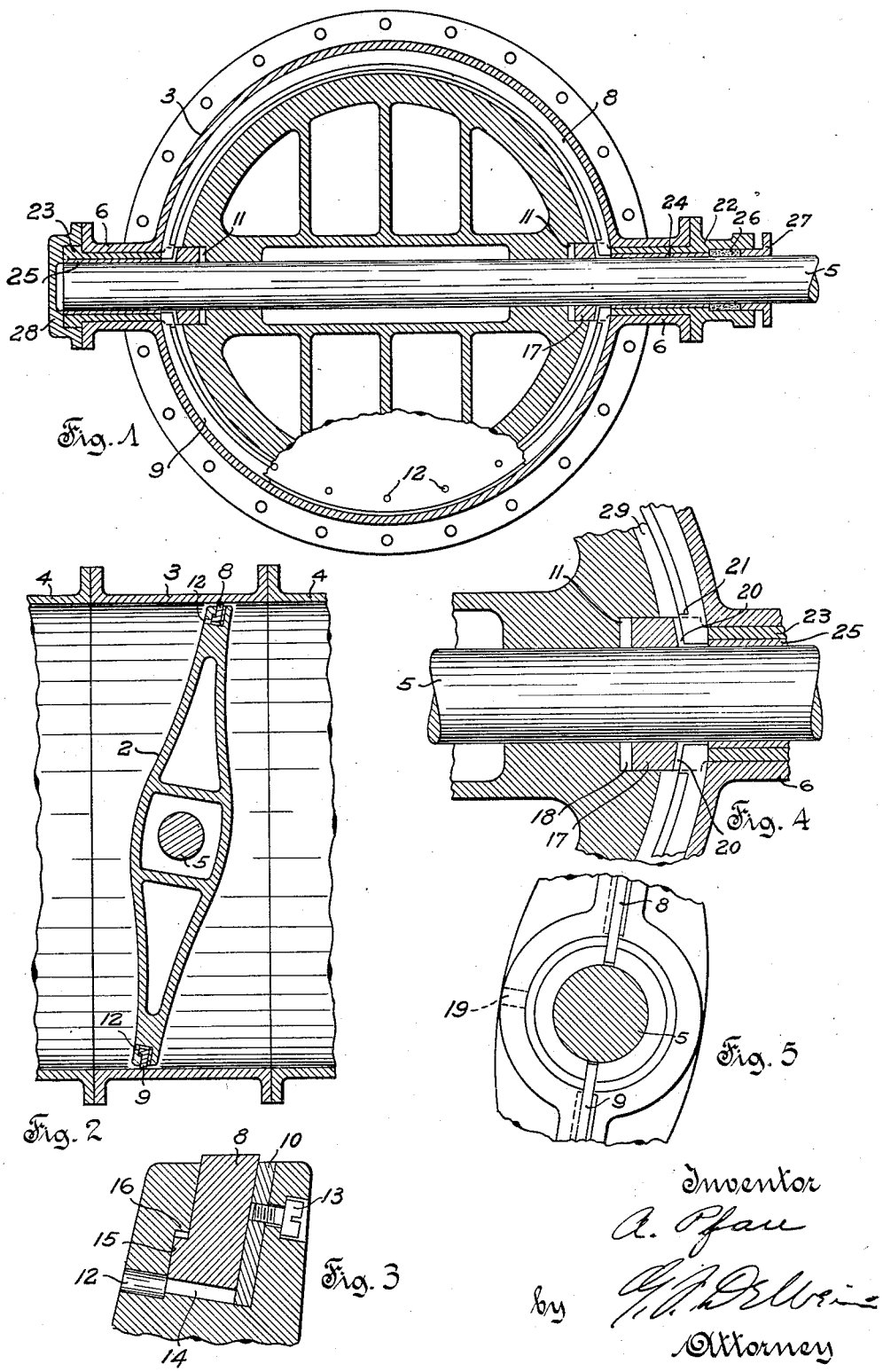

Patented May 31, 1932

1,860,619

UNITED STATES PATENT OFFICE

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

VALVE

Application filed July 12, 1930. Serial No. 467,455.

This invention relates in general to improvements in the construction and operation of valves and relates more specifically to improved means for effectively automatically sealing the entire peripheral joint between a pivoted or butterfly type of valve and its surrounding casing and bearing portions.

An object of the invention is to provide a valve structure which is simple in construction and efficient in operation.

It has been the practice in the prior art to provide the butterfly type of valve with packing or contacting segments designed to seal the joints between the valve and its cylindrical casing. In these devices of the prior art the extreme end portions of the segments or rings, adjacent the shaft of the valve more or less ineffectively seal the adjacent casing portions against leakage and objectionable gaps are further permitted to exist between the ends of the segments and the shaft of the valve, which gaps result from the expanding of the segments and consequent effective sealing of the joints at the medial portions thereof at the expense of the relatively poor seal at the ends of the segments. It will be noticed that these gaps become larger, especially in the larger sizes of valves, because the high fluid pressures acting on the valve casing cause the apertured shaft receiving portions thereof to become distorted in the general direction of the shaft while the intermediate portions of the casing are not so distorted and therefore these gaps vary on this account also.

The present invention contemplates the elimination of the above objectionable features of the sealing devices of the prior art and provides a simple, efficient and automatically operable means for preventing leakage past a valve of the butterfly type.

A clear conception of an embodiment of the invention and the operation of valve mechanism constructed in accordance therewith may be had by referring to the drawings, accompanying and forming a part of this specification, in which like reference characters designate the same or similar parts in the several views.

Fig. 1 is a transverse vertical section through a butterfly valve casing and showing a portion of the valve body in elevation.

Fig. 2 is a longitudinal vertical section through a butterfly valve casing.

Fig. 3 is an enlarged fragmentary transverse sectional view of the peripheral portion of the valve.

Fig. 4 is an enlarged fragmentary transverse sectional view of the valve casing showing a plunger bushing in operative relation with the adjacent casing portion.

Fig. 5 is an enlarged fragmentary end view of the valve body with the plunger bushing fitted in the recess provided for it.

The butterfly valve specifically illustrated in the drawings comprises in general a butterfly or disk valve body 2, a closed conduit or valve casing 3 associated with pipe line sections 4, a horizontal shaft 5 supported in bearing portions 6 of the casing 3 and providing a pivot for the valve body 2 and means for sealing the joint between the valve body 2 and the casing 3. The periphery of the valve body 2 is provided with an annular groove 29. Within this groove are located a pair of resilient packing segments 8, 9 on opposite sides of the shaft which normally have their ends in engagement with the shaft when the valve is in open position. Each of the packing segments 8, 9 is provided with an annular flange 15 which engages with the cooperating flange 16 on the valve body to limit the outward movement thereof when the valve body is not in fully closed position, as will later appear. The segments 8, 9 are held against lateral movement by retaining segments 10 secured in position by retaining bolts 13. By providing segments 10 the flanged packing segments may readily be removed for replacement or repair. An annular series of openings or ports 12 is provided in the pressure face of the valve body 2 which communicate with the working spaces 14 to cause the fluid pressure to act on the inner faces of the packing segments 8, 9 and thereby effectively seal the joint between the valve body 2 and the casing 3 when the former is in closed position.

The novel means cooperating with the described arrangement of pressure actuated packing segments which as such are not new with the applicant, will now be described in detail.

This comprises a pair of plunger bushings 17 which are received in similar annular recesses 11 concentric with the bore in the valve body 2 which receives the shaft 5. The bushings are made to snugly fit the shaft but to be free to slide thereon. The bushings are shown of a greater diameter than the outer diameter of the sleeve portion of the stuffing box 22 and the equal outer diameter of the sleeve 23 at the other side of the casing 3 and therefore the casing end of each bushing 17 is of a reduced diameter so as to engage only the machined ends of said sleeves and that of the lining bushings 24 and 25 which are similarly machined to register with said sleeve ends. Each bushing 17 is further provided with a pair of radial, diametrically opposite slots machined just wide enough to receive the plain outer portions of packing segments 8, 9, the flange 15 at each end of the packing segments being cut away as illustrated at 21. The bushings 17 are of lengths so as to leave working spaces 18 when their casing ends are in engagement with the adjacent bearing elements just described, which spaces communicate with ports 19 in the pressure face of the valve body to cause the fluid pressure to move the bushing in accordance with the deformation of the adjacent casing portions. The radial slots in which the ends of the packing segments are received are made deeper than the width of the packing segments 8, 9 to permit of a limited outward movement of each plunger independently of the position of the end portions of said packing segments and also to provide working spaces 20 for the admission of fluid pressure at the inner faces of the extreme ends of the packing segments 8, 9.

One bearing portion 6 of the valve casing may be provided with a cap 28 to cover the free end of shaft 5 and the outer end of lining bushing 25, which may be of bronze or babbit, and the outer end of sleeve 23. The other bearing portion 6 is provided with a stuffing box 22 having a sleeve portion which surrounds a lining bushing 24 which may also be of bronze or babbit. A packing ring 26 of any suitable material and which is compressed by a gland 27 seals the shaft against leakage past shaft 5 at this portion of the casing. Any suitable means for moving the valve body may be provided at this end of the shaft 5.

The operation of the disclosed device is as follows: When the valve body is brought to its closed or seating position the fluid pressure admitted through openings 12 will tightly press the medial portions of the packing segments 8, 9 against the valve casing 3. This pressure acts over the entire length of the groove in which these segments are positioned and since working spaces 20 communicate with said groove this fluid pressure will also cause the extreme end portions of the packing segments to be tightly pressed against the adjacent casing portions and bearing elements. The ends of the packing segments 8, 9 will tend to move away from the shaft 5 by reason of the expansion of said packing segments against the casing, leaving gaps between said ends and the shaft 5. These gaps are, however, lapped by material bounding the radial slots in the bushings 17 and while this material so laps said gaps the fluid pressure admitted into working spaces 20 continues to tightly press the extreme end portions of the packing segments 8, 9 against the adjacent casing portions and bearing elements and this same fluid pressure being simultaneously admitted into bushing working spaces 18 causes the casing ends of the bushings 17 to continue to press against the bearing elements as the bearing portions of the casing deform to seal the joints between the machined ends of the bearing elements 23, 25 and 22, 24 and the outer faces of the adjacent end portions of the packing segments 8, 9. A tight joint between the entire valve periphery and the casing is thereby effected which prevents the escape of fluid past the valve body when it is in its seated or closed position.

It should be understood that it is not desired to limit the invention to the exact details of construction and of operation herein shown and described, for various modifications within the scope of the claims may occur to persons skilled in the art.

It is claimed and desired to secure by Letters Patent:

1. In a butterfly valve, a valve body provided with a peripheral groove, a shaft for said valve body, a casing for said valve body, a plurality of packing segments in said groove extending to points spaced from said shaft when said valve body is in closed position and means comprising a plurality of pressure responsive members slidable in said valve body for lapping the joints between said segments and said shaft and for automatically sealing the joints between the outer faces of the end portions of said packing segments and the adjacent bearing elements of the shaft.

2. In a valve, a casing, a butterfly valve pivotally mounted therein, a shaft for mounting said valve, said valve being provided with a peripheral groove and a pair of recesses concentric with said shaft, a plurality of packing segments in said peripheral groove, plunger bushings in said recesses provided with slots communicating with said groove and snugly receiving the shaft-adjacent end portions of said segments, and means for admitting fluid pressure into said groove and against the inner faces of said bushings to cause the outer faces of the bushings and segments to tightly press against the adjacent casing portions while maintaining a pressure communication between said groove and said slots.

3. In a valve, a casing having a plurality of bearing portions, a butterfly valve pivotally mounted in said casing and provided with a plurality of packing segments, a plurality of bearing elements having machined faces in each of said bearing portions, a shaft for mounting said valve, said valve being provided with recesses concentric with said shaft, and plunger bushings in said recesses, said bushings having slots for snugly receiving the end of said packing segments and having machined faces which are pressed into engagement with the machined faces of said bearing elements by the action of fluid pressure on said bushings when said valve is in closed position.

4. In a valve, a casing, a disk valve provided with a peripheral groove, said valve being pivotally mounted in said casing, a shaft for mounting said valve, packing segments in said groove, said valve having a plurality of ports to admit the fluid pressure in said casing into said groove to cause the packing segments to tightly seal the joints between the peripheral valve portions, surrounded by said packing segments, and said casing, means comprising a pair of slidable elements for sealing the joints between the ends of said segments and said shaft, said elements being provided with a plurality of slots communicating with said groove to receive the end portions of said packing segments to cause fluid pressure to act outwardly on the extreme end portions of said packing segments, and means for admitting fluid pressure against the said elements to cause their outer ends to tightly seal the joints between the outer faces of the extreme end portions of the packing segments and the adjacent casing portions.

5. In a valve, a casing, a butterfly valve pivotally mounted therein, a shaft for mounting said valve, said valve being provided with a peripheral groove and a pair of recesses concentric with said shaft, a plurality of packing segments in said peripheral groove, a plurality of bearing elements for said shaft, said elements having machined faces at each side of said casing, plunger bushings in said recesses of larger diameters than the diameters of said elements, each of said bushings being provided with slots in which the shaft-adjacent ends of said segments are snugly received, and means for admitting fluid pressure into said groove and against the bushings when the valve is closed to cause the outer faces of said bushings and segments to tightly press against the adjacent bearing elements and casing portions respectively, while maintaining a pressure communication between said groove and said slots.

6. In a valve, a casing having a plurality of bearing portions and a cylindrical valve seat portion, bearing elements positioned in said bearing portions having machined faces which extend substantially to the inner surface of said casing, a butterfly valve pivotally mounted in said casing, a shaft for mounting said valve and journaled in said bearing elements, packing segments carried by the valve and engaging the casing, said valve being further provided with recesses, and plunger bushings located in said recesses and provided with means for lapping the joints between the ends of said segments and said shaft and with passages to cause the fluid pressure to move the bushings into engagement with the machined faces of said bearing elements to automatically seal the joints between the outer faces of the end portions of said packing segments and the said bearing faces.

7. In a valve, a casing, a butterfly valve arranged therein, a shaft upon which said butterfly valve is mounted, plunger members surrounding said shaft at opposite sides of the butterfly valve, and packing segments having their end portions arranged between the plunger members and the casing and snugly received within slots provided in said plunger members, said butterfly valve and said plunger members being provided with passages for admitting fluid pressure against the inner faces of the plunger members and against the inner faces of said packing segment end portions to cause the outer faces to tightly and sealingly engage the adjacent casing surfaces when the valve is in closed position.

8. In a valve, a casing having opposed bearing portions, a butterfly valve body pivotally mounted in said casing and provided with a plurality of packing segments, a bearing element having a machined inwardly directed face positioned in each of said bearing portions, a shaft received within said bearing elements for mounting said valve body, said valve body being provided with recesses concentric with said shaft, and plunger bushings in said recesses snugly fitting said shaft, each bushing having slots for snugly receiving the corresponding shaft-adjacent end portions of said packing segments and having a machined face which is pressed into sealing engagement with the machined face of the corresponding bearing element by the action of fluid pressure on said bushings when said valve is in closed position.

In testimony whereof, the signature of the inventor is affixed hereto.

ARNOLD PFAU.

CERTIFICATE OF CORRECTION.

Patent No. 1,860,619.  May 31, 1932.

ARNOLD PFAU.

It is hereby certified that error appears in the printed specification of the above numbered patent requiring correction as follows: Page 3, line 53, claim 5, strike out the words "at each side" and insert instead in opposite sides; and that the said Letters Patent should be read with this correction therein that the same may conform to the record of the case in the Patent Office.

Signed and sealed this 4th day of Octoober, A. D. 1932.

(Seal)

M. J. Moore,
Acting Commissioner of Patents.